(12) United States Patent
Dai et al.

(10) Patent No.: US 11,062,840 B2
(45) Date of Patent: Jul. 13, 2021

(54) ALTERNATING HYBRID EXCITATION ASSEMBLY AND APPLICATION THEREOF TO MOTOR AND TRANSFORMER

(71) Applicant: Shanshan Dai, Jiangsu (CN)

(72) Inventors: Shanshan Dai, Nanjing (CN); Shizhu Zhu, Nanjing (CN)

(73) Assignee: Shanshan Dai, Nanjinj (CN)

( * ) Notice: Subject to any disclaimer, the term of this patent is extended or adjusted under 35 U.S.C. 154(b) by 419 days.

(21) Appl. No.: 15/763,017

(22) PCT Filed: Aug. 26, 2016

(86) PCT No.: PCT/CN2016/096860
§ 371 (c)(1),
(2) Date: Mar. 23, 2018

(87) PCT Pub. No.: WO2016/096860
PCT Pub. Date: Mar. 23, 2018

(65) Prior Publication Data
US 2019/0156992 A1    May 23, 2019

(30) Foreign Application Priority Data
Mar. 30, 2016  (CN) .......................... 201610190350.8
Aug. 28, 2016  (CN) .......................... 201510537987.5

(51) Int. Cl.
*H01F 27/34*     (2006.01)
*H01F 27/24*     (2006.01)
(Continued)

(52) U.S. Cl.
CPC ............. *H01F 27/34* (2013.01); *H01F 27/24* (2013.01); *H01F 30/06* (2013.01); *H01F 30/16* (2013.01);
(Continued)

(58) Field of Classification Search
CPC .......... H02K 1/141; H02K 1/143; H02K 1/17; H02K 1/223; H02K 1/34; H02K 41/02;
(Continued)

(56) References Cited

FOREIGN PATENT DOCUMENTS

| CN | 2640104 Y | 9/2004 |
| CN | 101552122 A | 10/2009 |

(Continued)

OTHER PUBLICATIONS

Chi et al., Machine Translation of CN102315746, Jan. 2012 (Year: 2012).*

(Continued)

*Primary Examiner* — Quyen P Leung
*Assistant Examiner* — Eric Johnson
(74) *Attorney, Agent, or Firm* — Oliff PLC

(57) ABSTRACT

An alternating hybrid excitation assembly and its application to a rotary motor, linear motor and transformer, including: an even number of iron cores and a plurality of magnetic isolation layers arranged between, forming a loop, each core includes one or two notches wherein permanent magnets are inlaid, the two magnetic pole faces are attached to two opposite sides of the notch of the corresponding core, and a gap is reserved between one side face of each magnet and the side edge of the notch of the core; the magnets have opposite magnetic polarity directions, and an excitation coil surrounds the cores. A permanent magnetic potential and an excitation magnetic potential are superimposed to form an alternating hybrid excitation magnetic field, and thus electromagnetic energy efficiency is improved. Further, embodiments of the alternating hybrid excitation assembly applied to the rotary motor, the linear motor and the transformer.

10 Claims, 10 Drawing Sheets

(51) Int. Cl.
*H01F 27/28* (2006.01)
*H01F 30/06* (2006.01)
*H02K 1/14* (2006.01)
*H02K 1/27* (2006.01)
*H02K 3/04* (2006.01)
*H02K 41/02* (2006.01)
*H01F 30/16* (2006.01)
*H02K 1/17* (2006.01)
*H02K 41/03* (2006.01)

(52) U.S. Cl.
CPC ............... *H02K 1/141* (2013.01); *H02K 1/17* (2013.01); *H02K 1/27* (2013.01); *H02K 41/02* (2013.01); *H02K 41/031* (2013.01); *H01F 27/28* (2013.01); *H02K 3/04* (2013.01)

(58) Field of Classification Search
CPC .... H02K 41/03; H02K 41/031; H02K 41/033; H01F 27/24; H01F 27/245; H01F 27/25; H01F 27/255; H01F 27/26; H01F 27/28; H01F 27/29; H01F 27/30; H01F 27/32; H01F 27/34; H01F 30/06; H01F 30/16
USPC .... 310/216.023, 216.027–216.029, 216.031, 310/216.036–216.039
See application file for complete search history.

(56) References Cited

FOREIGN PATENT DOCUMENTS

| | | | |
|---|---|---|---|
| CN | 101764492 A | | 6/2010 |
| CN | 102315746 | * | 1/2012 |
| CN | 103559981 A | | 2/2014 |
| CN | 103560633 A | | 2/2014 |
| CN | 104811011 A | | 7/2015 |
| WO | 2005/086323 A1 | | 9/2005 |

OTHER PUBLICATIONS

Nov. 28, 2016 International Search Report issued in International Patent Application No. PCT/CN2016/096860.

Mar. 6, 2018 International Preliminary Report on Patentability issued in International Patent Application No. PCT/CN2016/096860.

* cited by examiner

ALTERNATING HYBRID EXCITATION ASSEMBLY AND APPLICATION THEREOF TO MOTOR AND TRANSFORMER

BACKGROUND OF THE INVENTION

Technical Field

The invention relates to motor techniques, in particular to a hybrid excitation assembly capable of generating an alternating resultant magnetic field, and an alternating hybrid excitation rotary motor, an alternating hybrid excitation linear motor and an alternating hybrid excitation gain transformer respectively adopting the hybrid excitation assembly.

Description of Related Art

According to a traditional switched reluctance motor stator, the permanent magnetic potential of permanent magnets and the excitation magnetic potential of exciters are combined to be applied to a motor rotor, and thus a novel technical approach for improving the energy efficiency of the motor is created. The Chinese patent with application No. CN201010102546.x (Nanjing University of Aeronautics and Astronautics) discloses a hybrid excitation segmented stator and rotor switched reluctance motor. According to the hybrid excitation segmented stator and rotor switched reluctance motor, a permanent magnet is inlaid between two stator tooth slots of a U-shaped stator block of the motor, excitation coils are wound on the yoke of the U-shaped stator block, and an excitation magnetic field generated by the excitation coils wound on the yoke of the U-shaped stator block is connected with a permanent magnetic field generated by the permanent magnet inlaid between the two stator tooth slots of the U-shaped block. In the structure, as the magnetic polarity direction of the permanent magnet inlaid between the stator tooth slots is fixed, only under the condition that the direction of excitation currents input to the excitation coils is consistent with the direction of the permanent magnetic field, the permanent magnetic field can be connected with the excitation magnetic field in parallel to have an effect on the outside. The Chinese patent with application No. CN201310584450.5 (Dai Shanshan) discloses the technique of inlaying one or two permanent magnets into a single iron core. When an alternating excitation current is input to an excitation coil, if one permanent magnet is inlaid in the single iron core, a hybrid excitation magnetic field can be generated only under the excitation of an excitation current in a certain direction, and an alternating magnetic field with the same magnetic field intensity cannot be obtained on the magnetic pole end faces of the single iron core. If two permanent magnets with opposite magnetic pole directions are inlaid in the single iron core, when an alternating excitation current is input to the excitation coil, the excitation and permanent magnet combination efficiency can be partially reduced by the interference from a magnetic circuit between the two permanent magnets and the excitation magnetic field, and thus the contribution of the permanent magnetic field to the hybrid excitation magnetic potential is reduced.

BRIEF SUMMARY OF THE INVENTION

The invention aims to provide a hybrid excitation assembly capable of generating an alternating resultant magnetic field through proper and reasonable design of the iron core structure, and the application of the hybrid excitation assembly capable of generating an alternating resultant magnetic field to a rotary motor, a linear motor and an alternating transformer.

According to the technical scheme adopted by the invention, an alternating hybrid excitation assembly is characterized by comprising an even number of iron cores and a plurality of magnetic isolation layers, wherein the magnetic isolation layers are arranged between the iron cores, and the iron cores and the magnetic isolation layers form a closed loop or an open loop; each iron core is provided with one or two notches, permanent magnets are inlaid in the notches of the iron cores, the two magnetic pole faces of each permanent magnet are closely attached to two opposite sides of the notch of the corresponding iron core, and a gap is reserved between one side face of each permanent magnet and the side edge of the notch of the corresponding iron core; and furthermore, the permanent magnets inlaid in the notches of every two adjacent iron cores have opposite magnetic polarity directions, and an excitation coil surrounds the iron cores.

According to the technical scheme of the alternating hybrid excitation assembly, the alternating hybrid excitation assembly comprises an excitation coil and an even number of open-loop C-shaped, U-shaped or V-shaped iron cores, wherein magnetic isolation layers are arranged between the iron cores, each iron core is provided with one or two notches, and permanent magnets are inlaid in the notches of the iron cores; the two magnetic pole faces of each permanent magnet are closely attached to two opposite sides of the notch of the corresponding iron core, and a gap is reserved between one side face of each permanent magnet and the side edge of the notch of the corresponding iron core; and furthermore, the permanent magnets inlaid in the notches of every two adjacent iron cores have opposite magnetic polarity directions, and the excitation coil surrounds the iron cores.

According to the technical scheme of the alternating hybrid excitation assembly, the alternating hybrid excitation assembly comprises an excitation coil and an even number of closed-loop iron cores, wherein closed-loop magnetic isolation layers are arranged between the iron cores, each iron core is provided with one or two notches, and permanent magnets are inlaid in the notches of the iron cores; the two magnetic pole faces of each permanent magnet are closely attached to two opposite sides of the notch of the corresponding iron core, and a gap is reserved between one side face of each permanent magnet and the side edge of the notch of the corresponding iron core; and furthermore, the permanent magnets inlaid in the notches of every two adjacent iron cores have opposite magnetic polarity directions, and the excitation coil surrounds the iron cores.

According to the technical scheme of the alternating hybrid excitation assembly, although the iron cores are in different shapes, the basic characteristics and the operating principle are approximately the same. A single iron core is replaced by an even number of iron cores, and the iron cores are magnetically isolated, so that when a forward current is input to the excitation coil, hybrid excitation magnetic potentials can be generated on the magnetic salient pole ends of the odd number of iron cores, when a reverse current is input to the excitation coil, hybrid excitation magnetic potentials can be generated on the magnetic salient pole ends of the even number of iron cores, and when the intensity of a forward excitation current is equal to that of a reverse excitation current, alternating magnetic fields at the magnetic salient pole ends of the even number of iron cores have opposite directions and equal intensities.

The invention further provides an alternating hybrid excitation rotary motor. The alternating hybrid excitation rotary motor comprises a rotor and a stator, and is characterized in that the stator is composed of a stator base and a plurality of alternating hybrid excitation assemblies, and the multiple alternating hybrid excitation assemblies are circularly, evenly and symmetrically arranged on the stator base and are magnetically isolated mutually; each alternating hybrid excitation assembly is provided with two C-shaped iron cores, wherein a C-shaped magnetic isolation layer is arranged between the two C-shaped iron cores, each C-shaped iron core is provided with two notches close to the open-loop position, two permanent magnets are separately inlaid in the two notches of each iron core, the two permanent magnets inlaid in the two notches of each iron core C have the same magnetic polarity direction, and the magnetic polarity direction of the permanent magnets inlaid in the notches of one C-shaped iron core is opposite to that of the permanent magnets inlaid in the notches of the other C-shaped iron core; the rotor is composed of a rotary shaft, a circular support and a plurality of permanent magnet units, the rotary shaft is fixed to the support, the multiple permanent magnet units are arranged on the circuit support, a gap is reserved between every two adjacent permanent magnet units, and every two adjacent permanent magnet units have different magnetic polarities; and when the rotor rotates, the two permanent magnetic pole faces of each permanent magnet unit on the circular support can coincide with and then pass through the two magnetic pole end faces of the C-shaped iron cores of each alternating hybrid excitation assembly on the stator base, and air gaps are reserved between the permanent magnetic pole end faces of the permanent magnet units and the magnetic pole end faces of the C-shaped iron cores.

According to the technical scheme of the alternating hybrid excitation rotary motor, the rotor is composed of a rotary shaft, a circular support, permanent magnet units and magnetizer units, wherein the rotary shaft is fixed to the support, the permanent magnet units and the magnetizer units are alternately and evenly arranged on the circuit support, a gap is reserved between each magnetizer unit and the adjacent permanent magnet unit, and every two adjacent permanent magnet units have different polarity directions; and when the rotor rotates, the two permanent magnetic pole faces of each permanent magnet unit on the circular support can coincide with and then pass through the two magnetic pole end faces of the C-shaped iron cores of each alternating hybrid excitation assembly on the stator base, and air gaps are reserved between the permanent magnetic pole end faces of the permanent magnet units and the magnetic pole end faces of the C-shaped iron cores.

The invention further provides an alternating hybrid excitation linear motor. The alternating hybrid excitation linear motor comprises a movable component and a fixed component, and is characterized in that the fixed component is composed of a fixed component base and a plurality of alternating hybrid excitation assemblies, and the multiple alternating hybrid excitation assemblies are fixed into slots of the fixed component base at set equal intervals; each alternating hybrid excitation assembly is provided with two C-shaped iron cores, wherein a C-shaped magnetic isolation layer is arranged between the two C-shaped iron cores, each C-shaped iron core is provided with two rectangular notches close to the open-loop position, two permanent magnets are separately inlaid in the two notches of each C-shaped iron core, the permanent magnets inlaid in the two notches of each C-shaped iron core have the same magnetic polarity direction, and the magnetic polarity direction of the permanent magnets inlaid in the notches of one C-shaped iron core is opposite to that of the permanent magnets inlaid in the notches of the other iron core; the movable component is composed of a movable component base and a plurality of permanent magnets, the multiple permanent magnets are inlaid in slots of the movable component base at set equal intervals, every two adjacent permanent magnets have different magnetic polarities, and the two permanent magnetic pole end faces of each permanent magnet are perpendicular to the longitudinal axis, along which the movable component moves, of the fixed component base, namely the two polar end faces of each permanent magnet are parallel and opposite to the two magnetic pole end faces of the iron cores of each C-shaped alternating hybrid excitation assembly; and when the movable component moves linearly along the longitudinal axis of the fixed component, the vertical center line of the magnetic pole end faces of each C-shaped alternating hybrid excitation assembly on the fixed component base sequentially coincides with the vertical center lines of the permanent magnetic pole end faces of the permanent magnets on the movable component base one by one, and air gaps are reserved between the magnetic pole end faces of the C-shaped alternating hybrid excitation assemblies and the permanent magnetic pole end faces.

According to the technical scheme of the alternating hybrid excitation linear motor, the movable component is composed of a movable component base, a plurality of permanent magnets and a plurality of magnetizers, wherein the permanent magnets and the magnetizers are alternately inlaid in slots of the movable component base, the permanent magnetic pole end faces of the permanent magnets and the magnetic conduction end faces of the magnetizers are perpendicular to the longitudinal axis of the fixed component base, and every two adjacent permanent magnets have different magnetic polarities.

The invention further provides alternating hybrid excitation linear motor. The alternating hybrid excitation linear motor comprises a movable component and a fixed component, and is characterized in that the fixed component is composed of a fixed component base and a plurality of permanent magnets, the multiple permanent magnets are inlaid in slots of the fixed component base at set equal intervals, every two adjacent permanent magnets have different magnetic polarity directions, and the magnetic pole end faces of the permanent magnets are in the direction perpendicular to the longitudinal axis along which a movable component base moves; the movable component is composed of a movable component base and a plurality of alternating hybrid excitation assemblies, and the multiple alternating hybrid excitation assemblies are fixed into slots of the movable component base at set equal intervals; each alternating hybrid excitation assembly is provided with two C-shaped iron cores, wherein a C-shaped magnetic isolation layer is arranged between the two C-shaped iron cores, each C-shaped iron core is provided with two rectangular notches close to the open-loop position, two permanent magnets separately are inlaid in the two rectangular notches of each C-shaped iron core, the two permanent magnets inlaid in the two rectangular notches of each iron core have the same magnetic polarity direction, and the magnetic polarity direction of the permanent magnets inlaid in the notches of one C-shaped iron core is opposite to that of the permanent magnets inlaid in the notches of the other C-shaped iron core; the magnetic pole end faces of each permanent magnet on the fixed component base are parallel and opposite to the two magnetic pole end faces of the iron cores of each C-shaped alternating hybrid excitation assembly on the movable component base, and air gaps are reserved between the magnetic pole end faces of the C-shaped alternating hybrid excitation assemblies and the magnetic pole end faces of the permanent magnets; and when the movable component moves linearly along the longitudinal axis of the fixed component, the vertical center line of the magnetic pole end faces of each C-shaped alternating hybrid excitation assembly on the movable component sequentially coincides with the vertical center line of the permanent magnetic pole end faces of each permanent magnet on the fixed component base one by one.

According to the technical scheme of the alternating hybrid excitation linear motor, the fixed component is composed of a fixed component base, a plurality of permanent magnets and a plurality of magnetizers, wherein the permanent magnets and the magnetizers are alternately inlaid in slots of the fixed component base, the magnetic pole end faces of the permanent magnets and the magnetic conduction end faces of the magnetizers are perpendicular to the longitudinal axis of the fixed component base, and every two adjacent permanent magnets have different magnetic polarities.

The invention further provides an alternating hybrid excitation transformer. The alternating hybrid excitation transformer is characterized by comprising alternating hybrid excitation assemblies, input coils and output coils, wherein each alternating hybrid excitation assembly is composed of an even number of closed-loop iron cores, closed-loop magnetic isolation layers are arranged between the iron cores, each iron core is provided with one or two notches, permanent magnets are inlaid in the notches of the iron cores, the two magnetic pole faces of each permanent magnet are closely attached to two opposite sides of the notch of the corresponding iron core, and a gap is reserved between one side face of each permanent magnet and the side edge of the notch of the corresponding iron core; and furthermore, the permanent magnets inlaid in the notches of every two adjacent iron cores have opposite magnetic polarity directions, and the input coils and the output coils surround the closed-loop iron cores of the alternating hybrid excitation assemblies.

The invention has the following advantages:

1. Alternating hybrid excitation magnetic fields with opposite magnetic field directions and equal magnetic field intensities are obtained on the magnetic salient poles of the alternating hybrid excitation assembly.

2. A feasible technical scheme is provided for superimposing the magnetic energy product of permanent magnets to the excitation magnetic potential to improve electromagnetic energy efficiency.

3. The alternating hybrid excitation assembly capable of generating an alternating resultant magnetic field can be applied to a rotary motor or a linear motor, so that the structure of the motor is simplified, the motor torque is greatly improved, the consistency of the motor torque is ensured, and the controllability and torque stability of the motor are also remarkably improved.

4. The motor rotors are alternately provided with the permanent magnets and the magnetizers, so that the operating stability of the motor is improved, permanent magnet materials can be saved, the manufacturing cost of the motor is reduced, and energy is saved.

5. The alternating hybrid excitation assembly capable of generating an alternating magnetic field can be applied to a transformer, so that the novel alternating gain transformer is formed, the self loss of the transformer can be compensated, and energy efficiency is improved.

Figure 1:
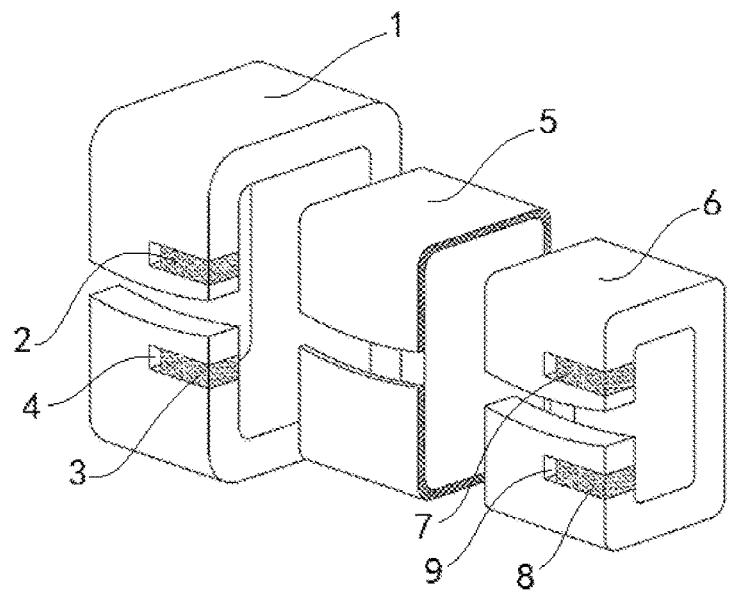
FIG. 1 is a structural exploded view of an alternating hybrid excitation assembly capable of generating an alternating magnetic field, wherein two iron cores are each in an open-loop C shape.

In the FIGS, the marks are as below: 1, C-shaped outer iron core; 2, permanent magnet (the upper portion is the N pole); 3, permanent magnet (the upper portion is the N pole); 4, gap between the side face of each permanent magnet and a notch of the outer iron core; 5, magnetic isolation layer; 6, C-shaped inner iron core; 7, permanent magnet (the upper portion is the S pole); 8, permanent magnet (the upper portion is the S pole); 9, gap between the side face of each permanent magnet and a notch of the inner iron core; 10, excitation coil; 11, excitation magnetic force line formed in the outer iron core when a reverse excitation current is input to the excitation coil; 12, permanent magnetic force line formed in the outer iron core and generated by an excitation current when a reverse excitation current is input to the excitation coil; 13, excitation magnetic force line formed in the outer iron core when a forward excitation current is input to the excitation coil; 14, permanent magnetic force line formed around the gap between the outer iron core and each permanent magnet by the permanent magnet when a forward excitation current is input to the excitation coil; 15, permanent magnetic force line formed around the gap between the outer iron core and the each permanent magnet by the permanent magnet when no excitation current is input to the excitation coil; 16, excitation magnetic force line formed in the inner iron core when a reverse excitation coil is input to the excitation coil; 17, permanent magnetic force line formed around the gap between the outer iron core and each permanent magnet by the permanent magnet when a reverse excitation current is input to the excitation coil; 18, excitation magnetic force line formed in the inner iron core when a forward excitation current is input to the excitation coil; 19, permanent magnetic force line formed in the inner iron core and generated by an excitation current when a forward excitation current is input to the excitation coil; 20, permanent magnetic force line formed around the gap between the inner iron core and each permanent magnet by the permanent magnet when no excitation current is input to the excitation coil; 21, circular support; 22, rotary shaft; 23, permanent magnet fixed to the circuit support; 24, permanent magnet inlaid the notch of the iron core; 25, outer C-shaped iron core; 26, magnetic isolation layer; 27, inner C-shaped iron core; 28, excitation coil; 31, circular support; 32, rotary shaft; 33, permanent magnet fixed to the circuit support; 34, permanent magnet inlaid the notch of the iron core; 35, outer C-shaped iron core; 36, magnetic isolation layer; 37, inner C-shaped iron core; 38, excitation coil; 39, magnetizer; 41, fixed component base; 42, alternating hybrid excitation assembly; 43, permanent magnet; 44, movable component base; 51, movable component base; 52, alternating hybrid excitation assembly; 53, permanent magnet; 54, fixed component base; 61, fixed component base; 62, alternating hybrid excitation assembly; 63, permanent magnet; 64, movable component base; 65, magnetizer; 71, movable component base; 72, alternating hybrid excitation assembly; 73, permanent magnet; 74, fixed component base; 75, magnetizer; 81, primary coil; 82, secondary coil; 83, outer closed-loop iron core; 84, inner closed-loop iron core; 85, closed-loop magnetic isolation layer; 86, permanent magnet inlaid in the notch of the inner iron core; 87, permanent magnet inlaid in the notch of the outer iron core; 88, gap between the side face of the permanent magnet inlaid in the notch of the iron core and the iron core; 91, primary coil; 92, secondary coil; 93, hybrid excitation magnetic force line of the inner closed-loop iron core when a forward current is input to the primary coil; 94, excitation magnetic force line of the outer closed-loop iron core when a forward current is input to the primary coil; 95, magnetic force line formed by the permanent magnet of the outer closed-loop iron core when forward and reverse currents are input to the primary coil; 96, hybrid excitation magnetic force line of the inner closed-loop iron core when a forward current is input to the primary coil; 97, excitation magnetic force line of the outer closed-loop iron core when a forward current is input to the primary coil; 98, magnetic force line formed by the permanent magnet of the inner closed-loop iron core when no current is input to the primary coil; 99, magnetic force line formed by the permanent magnet of the outer closed-loop iron core when no current is input to the primary coil; 100, magnetic force line formed by the permanent magnet of the inner closed-loop iron core when a reverse current is input to the primary coil; 101, excitation magnetic force line of the inner closed-loop iron core when a reverse current is input to the primary coil; 102, hybrid excitation magnetic force line formed by the permanent magnet of the outer closed-loop iron core when a reverse current is input to the primary coil; 103, excitation magnetic force line of the inner closed-loop iron core when a reverse current is input to the primary coil; 104, hybrid excitation magnetic force line of the outer closed-loop iron core when a reverse current is input to the primary coil.

DETAILED DESCRIPTION OF THE INVENTION

First Embodiment

The first embodiment of the invention provides an alternating hybrid excitation assembly provided with two C-shaped iron cores.

FIG. 1 is the structural exploded view of the alternating hybrid excitation assembly provided with the two C-shaped iron cores in the first embodiment.

In the embodiment, a C-shaped iron core assembly is divided into an outer layer and an inner layer, namely an outer iron core 1 and an inner iron core 6, and a magnetic isolation layer 5 is arranged between the two iron cores. The outer iron core 1 is provided with two notches, and a permanent magnet 2 and a permanent magnet 3 are inlaid in the two notches separately. The permanent magnet 2 and the permanent magnet 3 have the same magnetic polarity direction, namely the upper portion is the N pole, and the lower portion is the S pole. Gaps 4 are formed between the side face of the permanent magnet 2 and the outer iron core 1 as well as between the side face of the permanent magnet 3 and the outer iron core 1. The inner iron core 6 is provided with two notches, and a permanent magnet 7 and a permanent magnet 8 are inlaid in the two notches separately. The permanent magnet 7 and the permanent magnet 8 of the inner iron core have the same magnetic polarity direction, namely the upper portion is the S pole, and the lower portion is the N pole. Gaps are formed between the side face of the permanent magnet 7 and the inner iron core 6 as well as between the side face of the permanent magnet 8 and the inner iron core 6. The magnetic polarity direction of the permanent magnet 2 and the permanent magnet 3 of the outer iron core 1 is opposite to that of the permanent magnet 7 and the permanent magnet 8 of the inner iron core 6. An excitation winding is wound outside the two C-shaped iron cores, and thus the alternating hybrid excitation assembly capable of generating an alternating magnetic field is formed. The magnetic resistance between an inner closed magnetic circuit and an outer closed magnetic circuit should be much greater than that between magnetic sources in the inner closed magnetic circuit and the outer closed magnetic circuit. The inner layer and the outer layer are each provided with a multi-magnetic source and multi-branch circuit complex closed magnetic loop formed by an excitation magnetic source and a permanent magnetic source.

Figure 2:
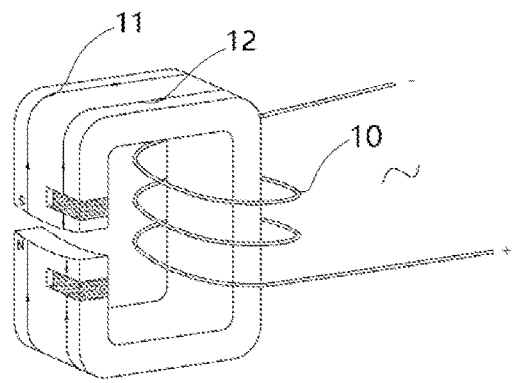
FIG. 2 shows a hybrid excitation magnetic polarity formed in an outer iron core when a reverse current is input to an excitation coil.
Figure 5:
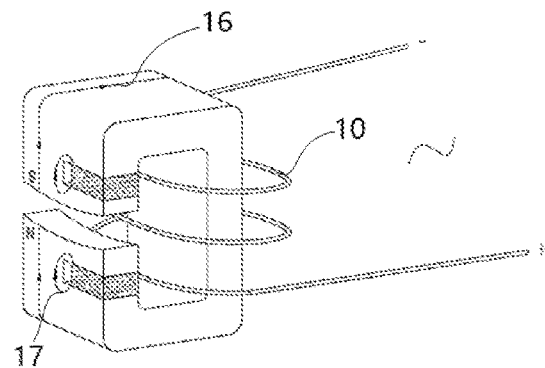
FIG. 5 shows a hybrid excitation magnetic polarity formed in an inner iron core when a reverse current is input to the excitation coil.

The operating principle of the alternating hybrid excitation assembly provided with the two C-shaped iron cores and capable of generating an alternating magnetic field is as follows:

Firstly, when a reverse current is input to the excitation winding 10, namely when the S pole is formed on the upper magnetic pole end face, at the open-loop position, of the outer iron core and the N pole is formed on the lower magnetic pole end face, at the open-loop position, of the outer iron core (as is shown in FIG. 2), in the outer iron core, as the excitation direction is identical with the direction of the permanent magnetic field, both an excitation magnetic force line 11 generated under the excitation of the excitation coil and a permanent magnetic force line 12 generated by the permanent magnet 2 and the permanent magnet 3 under the effect of the excitation current of the excitation coil are formed; and meanwhile, when a reverse current is input to the excitation winding 10, the S pole is formed on the upper magnetic pole end face of the inner iron core and the N pole is formed on the lower magnetic pole end face of the inner iron core (as is shown in FIG. 5); however, as the direction of the permanent magnetic field formed by the permanent magnet 7 and the permanent magnet 8 inlaid in the inner iron core is opposite to the direction of the excitation magnetic field formed by the excitation winding 10, the original shortest iron core magnetic circuit of the permanent magnet 7 and the permanent magnet 8 is maintained to form a permanent magnetic loop 14, and thus only an excitation magnetic force line 16 generated under the excitation of the excitation coil is formed in the air gap of the inner iron core.

Figure 3:
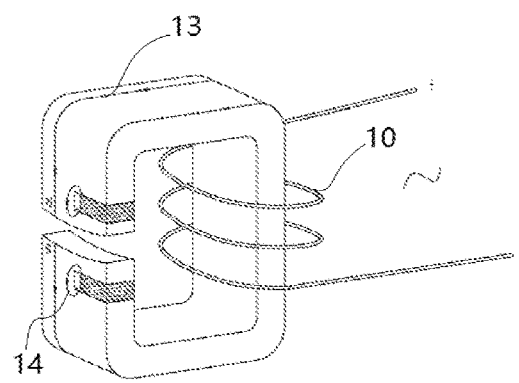
FIG. 3 shows an excitation magnetic polarity formed in the outer iron core when a forward current is input to the excitation coil (in this case, the permanent magnetic potential of permanent magnets makes no contribution to the magnetic potential of the magnetic pole end faces of the outer iron core).
Figure 6:
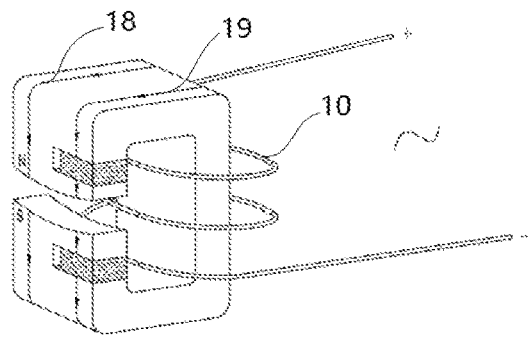
FIG. 6 shows an excitation magnetic polarity formed in the inner iron core when a forward current is input to the excitation coil (in this case, the permanent magnetic potential of the permanent magnets makes no contribution to the magnetic potential of the magnetic pole end faces of the outer iron core).

Secondly, when a forward current is input to the excitation winding 10, the magnetic polarities of the magnetic pole end faces, at the open-loop position, of the outer iron core (as is shown in FIG. 3) and the inner iron core (as is shown in FIG. 6) are completely changed, namely the N pole is formed on the upper magnetic pole end face and the S pole is formed on the lower magnetic pole end face, only an excitation magnetic force line 13 generated under the excitation of the excitation coil is formed in the outer iron core, both an excitation magnetic force line 18 and a permanent magnetic force line 19 are formed in the inner iron core, in this way, an excitation and permanent hybrid magnetic potential is formed between the upper magnetic pole end face and the lower magnetic pole end face of the inner iron core, and a pure excitation magnetic potential is formed between the upper magnetic pole end face and the lower magnetic pole end face of the outer iron core.

Figure 4:
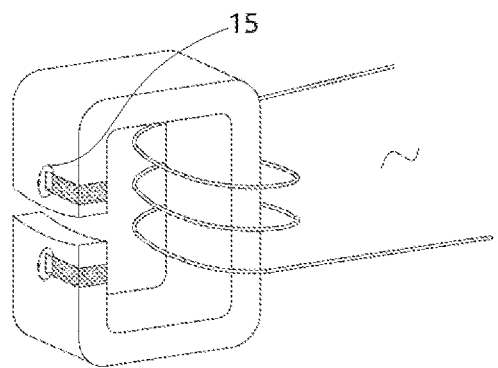
FIG. 4 shows that when no current is input to the excitation coil, the outer iron core has no magnetic potential.
Figure 7:
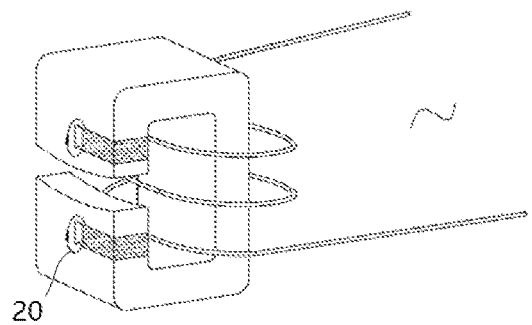
FIG. 7 shows that when no current is input to the excitation coil, the inner iron core has no magnetic potential.

Thirdly, when no current is input to the excitation winding, closed magnetic loops 15 are formed around the gaps by the permanent magnets inlaid in the outer iron core as is shown in FIG. 4, closed magnetic loops 20 are formed around the gaps by the permanent magnets inlaid in the inner iron core as is shown in FIG. 7, and thus the magnetic pole end faces of the outer iron core and the inner iron core have no magnetic potential.

Fourthly, when forward and reverse alternating excitation currents are input to the excitation winding, alternating hybrid excitation magnetic fields with the N polarity and the S polarity alternately changing at a frequency identical with the change frequency of the excitation currents are generated in the magnetic pole end faces of the two iron cores.

According to the embodiment, the alternating hybrid excitation assembly is capable of generating an alternating resultant magnetic field which changes along with changes of the excitation current direction of the excitation coil, thereby being capable of being applied to rotary motors, linear motors and transformers and comprehensively improving the energy efficiency and controllability of the rotary motors, the liner motors and the transformers.

Second Embodiment

Figure 8:
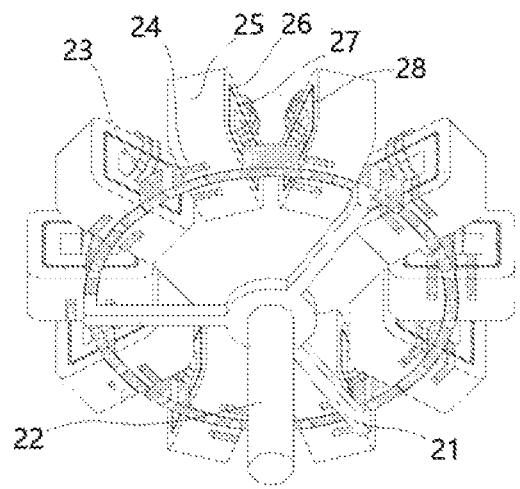
FIG. 8 is a structural diagram of an inner-rotor hybrid excitation motor in the second embodiment of the invention.

The embodiment of the invention provides the application of the alternating hybrid excitation assembly to a switched reluctance rotary motor. The structure of the motor in the embodiment is shown in FIG. 8. Ten C-shaped alternating hybrid excitation assemblies are circularly, evenly and symmetrically arranged on a stator base, and all the alternating hybrid excitation assemblies are magnetically isolated mutually. A rotor is formed by a circular support 21, a rotary shaft 22 and sixteen permanent magnets 23.

The structure of the ten C-shaped alternating hybrid excitation assemblies is shown in FIGS. 1-7. Each C-shaped alternating hybrid excitation assembly is provided with two C-shaped iron cores, wherein a C-shaped magnetic isolation layer is arranged between the two C-shaped iron cores, each C-shaped iron core is provided with two rectangular notches close to the open-loop position, two permanent magnets are inlaid in the two rectangular notches separately, the two permanent magnets inlaid in the two rectangular notches in each C-shaped iron core have the same magnetic polarity, and the magnetic polarity of the two permanent magnets inlaid in the two rectangular notches in one C-shaped iron core is opposite to that of the two permanent magnets inlaid in the two rectangular notches in the other C-shaped iron core. Please see the first embodiment for the operating principle of the C-shaped alternating hybrid excitation assemblies.

The sixteen permanent magnets 23 are inlaid in the circular support 21, a gap is reserved between every two adjacent permanent magnets, the magnetic polarity direction of the permanent magnets is identical with the radial direction of the motor, and every two adjacent permanent magnets have different magnetic polarities.

When the rotor rotates, the two permanent magnetic pole faces of each permanent magnet on the circuit support can pass through the space between the two magnetic pole end faces of each of the C-shaped iron cores of all the alternating hybrid excitation assemblies on the stator base, and air gaps are reserved between the permanent magnetic pole end faces of the permanent magnet units and the magnetic pole end faces of the C-shaped iron cores.

As the alternating hybrid excitation assemblies on the stator are magnetically isolated mutually, the current direction and the current magnitude can be controlled independently through an excitation power supply control circuit.

As for the control principle of the motor in the embodiment, the direction of an excitation current input to the C-shaped alternating hybrid excitation assemblies is controlled by an excitation control current according to the relative positions of the magnetic pole end faces of each C-shaped alternating hybrid excitation assembly and the magnetic pole ends of the permanent magnets, so that positive torque is obtained, and negative torque is avoided. The specific control process is as follows:

When the magnetic pole end faces of a certain C-shaped alternating hybrid excitation assembly on the motor stator are right opposite to the magnetic pole end faces of a certain permanent magnet on the motor rotor, namely when the radial center line of the magnetic pole end faces of the C-shaped alternating hybrid excitation assembly deviates from the radial center line of the magnetic pole end faces of the permanent magnet by a certain angle after coinciding with the radial center line of the magnetic pole end faces of the permanent magnet (the radial center line of the magnetic pole end faces of the C-shaped alternating hybrid excitation assembly refers to the radial line starting from the center of the rotary shaft of the motor and penetrating through the geometric center points of the magnetic pole end faces of the C-shaped alternating hybrid excitation assembly, and the radial center line of the magnetic pole end faces of the permanent magnet refers to the radial line starting from the center of the rotary shaft of the motor and penetrating through the geometric center points of the magnetic pole end faces of the permanent magnet of the rotor), the excitation power supply control circuit instantly changes the excitation current direction of the C-shaped alternating hybrid excitation assembly, namely a forward excitation current is changed into a zero current and then changed into a reverse excitation current, or a reverse excitation current is changed into a zero current and then changed into a forward excitation current. After the excitation current direction is changed, magnetic repulsive force with the magnetic acting force direction identical with the positive torque direction of the rotor starts to be formed between the C-shaped alternating hybrid excitation assembly and the opposite permanent magnet.

When the radial center line of the magnetic pole end faces of a certain alternating hybrid excitation assembly on the motor stator does not coincide with the radial center line of the magnetic pole end faces of a certain permanent magnet on the motor rotor, namely when the magnetic pole end faces of the C-shaped alternating hybrid excitation assembly deviate from the magnetic pole end faces of the permanent magnet, an excitation current input to the C-shaped alternating hybrid excitation assembly by an excitation control power supply is in the direction making the magnetic polarity of the magnetic pole end faces of the C-shaped alternating hybrid excitation assembly identical with that of the nearest permanent magnet in the rotating-away direction of the rotor, so that repulsive positive torque is formed; and the magnetic polarity of the magnetic pole end faces of the C-shaped alternating hybrid excitation assembly is opposite to that of the nearest permanent magnet in the rotating-back direction of the rotor, so that attractive positive torque is formed.

As for each C-shaped alternating hybrid excitation assembly on the stator, the input duration of an excitation current in a certain direction is obviously longer than the duration consumed for changing the excitation current direction of the C-shaped alternating hybrid excitation assembly. As for all the C-shaped alternating hybrid excitation assemblies on the stator, the number of alternating hybrid excitation assemblies in the excitation current input state is greater than the number of alternating hybrid excitation assemblies in the zero excitation current state. Based on the two factors, the motor rotor can obtain continuous positive torque acting force.

In the embodiment, the alternating hybrid excitation assembly is additionally provided with the permanent magnets inlaid in the two iron cores, the magnetic energy potential of part of the permanent magnets can be superimposed into the excitation magnetic energy potential under the excitation of the excitation current of the excitation coil, and thus the energy efficiency and torque of the motor are improved.

Third Embodiment

Figure 9:
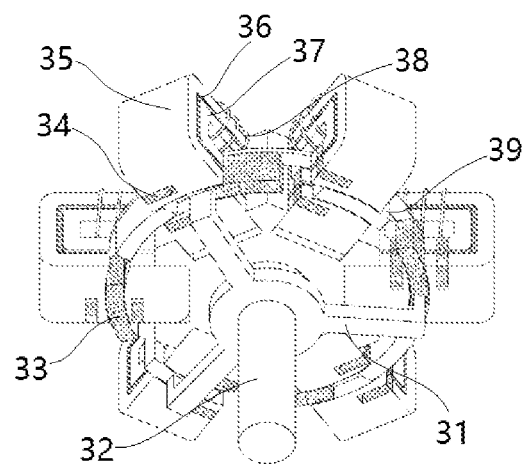
FIG. 9 is a structural diagram of a hybrid excitation motor with magnetizers additionally arranged between inner-rotor permanent magnets in the third embodiment of the invention.

The third embodiment of the invention provides another application form of the alternating hybrid excitation assembly to a switched reluctance rotary motor. The structure of the motor in the embodiment is shown in FIG. 9.

Six C-shaped alternating hybrid excitation assemblies are circularly, evenly and symmetrically arranged on a stator base, and all the alternating hybrid excitation assemblies are magnetically isolated mutually. A rotor is formed by a circuit support 31, a rotary shaft 32, four permanent magnets 33 and four magnetizers 39.

The structure of the six C-shaped alternating hybrid excitation assemblies is shown in FIGS. 1-7. Please see the first embodiment for the operating principle of the C-shaped alternating hybrid excitation assemblies.

The four permanent magnets 33 and the four magnetizers 39 are alternately inlaid in the circular support 31, a gap is reserved between each permanent magnet and the adjacent magnetizer, the magnetic polarity direction of the permanent magnets is identical with the radial direction of the motor, and every two adjacent permanent magnets have different magnetic polarities.

When the rotor rotates, the two permanent magnetic pole faces of each permanent magnet on the circular support and the two magnetic conduction end faces of each magnetizer can pass through the space between the two magnetic pole end faces of each of the C-shaped iron cores of the six alternating hybrid excitation assemblies on the stator base, and air gaps are reserved between the magnetic pole end faces of the permanent magnets and the magnetic pole end faces of the C-shaped iron cores as well as between the magnetic conduction end faces of the magnetizers and the magnetic pole end faces of the C-shaped iron cores.

As the alternating hybrid excitation assemblies on the stator are magnetically isolated mutually, the current direction and the current magnitude can be controlled independently through an excitation power supply control circuit.

The control principle and method of the motor in the embodiment are identical with those in the second embodiment and thus are not illustrated anymore.

The key characteristic of the embodiment lies in that the magnetizers 39 are additionally arranged on the circuit support 31 of the rotor. The magnetizers 39 interact with the alternating hybrid excitation assemblies, so that on the one hand, negative influences of a reverse magnetic field formed by current reversing of the excitation coils of the alternating hybrid excitation assemblies on the magnetic performance of the permanent magnet materials on the rotor are reduced, and on the other hand, the magnetizers provide a magnetic loop for the alternating hybrid excitation assemblies and thus also participate in the moment work of the motor, thereby further improving the overall torque of the motor, or reducing the number of required permanent magnets under the same torque output condition, and also reducing cost and the reversing frequency of an excitation power supply.

Fourth Embodiment

The fourth embodiment of the invention provides the application of the double-layer alternating hybrid excitation assembly capable of generating an alternating resultant magnetic field to a linear motor.

Figure 10:
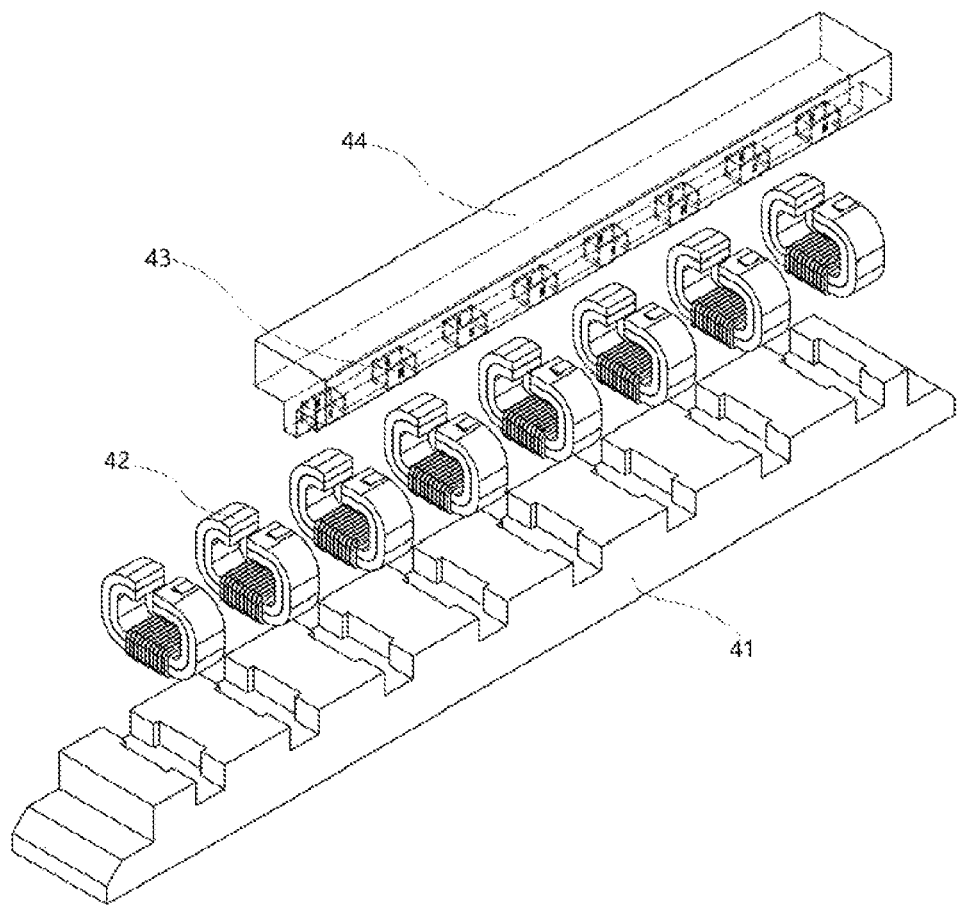
FIG. 10 is a structural assembly diagram of an alternating hybrid excitation linear motor in the fourth embodiment of the invention.

The structure of the linear motor in the embodiment is shown in FIG. 10.

In the embodiment, a fixed component is composed of a fixed component base 41 and a plurality of alternating hybrid excitation assemblies 42. The multiple alternating hybrid excitation assemblies are fixed into slots of the fixed component base at set equal intervals. Each alternating hybrid excitation assembly is provided with two C-shaped iron cores, wherein a C-shaped magnetic isolation layer is arranged between the two C-shaped iron cores, each C-shaped iron core is provided with two rectangular notches close to the open-loop position, and two permanent magnets are inlaid in the two rectangular notches of each iron core separately; and the two permanent magnets inlaid in the two rectangular notches of each C-shaped iron core have the same magnetic polarity, and the magnetic polarity of the two permanent magnets inlaid in the two rectangular notches of one C-shaped iron core is opposite to that of the two permanent magnets inlaid in the two rectangular notches of the other C-shaped iron core (as is shown in FIG. 1). In the embodiment, a movable component is composed of a movable component base 44 and eight permanent magnets 43, wherein the eight permanent magnets are inlaid in slots of the movable component base at set equal intervals, the two permanent magnetic pole end faces of each permanent magnet are perpendicular to the longitudinal axis of the fixed component base, namely the magnetic pole end faces of each permanent magnet are in the direction perpendicular to the longitudinal axis of the fixed component base, and every two adjacent permanent magnets have different magnetic polarities. The movable component moves along the longitudinal axis of the fixed component. The magnetic pole end faces of each C-shaped alternating hybrid excitation assembly on the fixed component base are opposite to the permanent magnetic pole end faces of each permanent magnet on the movable component base, and air gaps are reserved between the magnetic pole end faces of the C-shaped alternating hybrid excitation assemblies and the permanent magnetic pole end faces.

Figure 11:
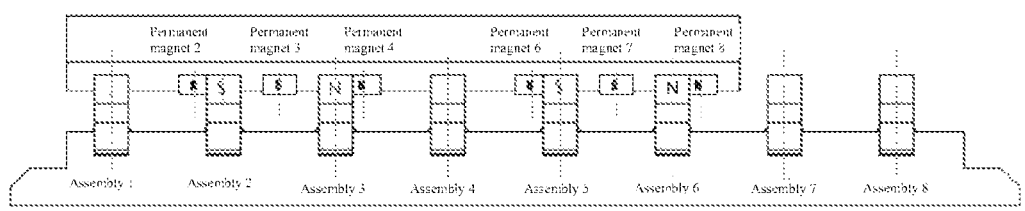
FIG. 11 is a diagram of a first characteristic position of the alternating hybrid excitation linear motor in the fourth embodiment of the invention.
Figure 12:
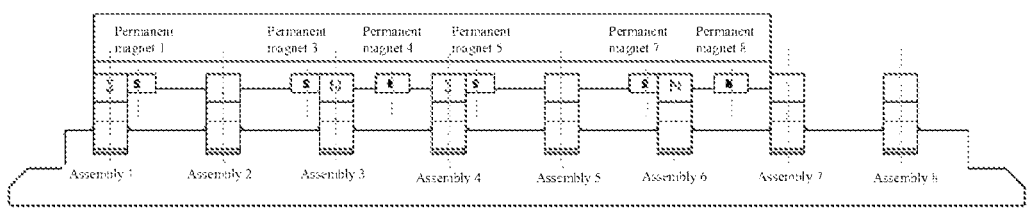
FIG. 12 is a diagram of a second characteristic position of the alternating hybrid excitation linear motor in the fourth embodiment of the invention.
Figure 13:
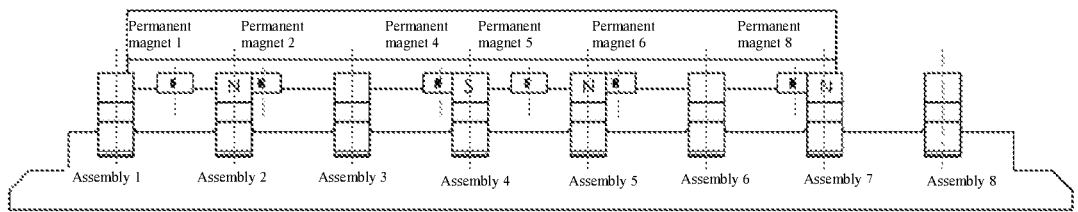
FIG. 13 is a diagram of a third characteristic position of the alternating hybrid excitation linear motor in the fourth embodiment of the invention.

In the embodiment, when the movable component moves linearly along the longitudinal axis of the fixed component, the characteristics of three characteristic positions of the movable component relative to the fixed component are shown in FIGS. 11-13.

As is shown in FIG. 11, at the first position, the vertical center lines of the permanent magnet 1 and the permanent magnet 5 of the movable component separately coincide with the vertical center lines of the alternating hybrid excitation assembly 1 and the alternating hybrid excitation assembly 4 of the movable component, at the moment, the excitation current in the excitation coils of the alternating hybrid excitation assembly 1 and the alternating hybrid excitation assembly 4 is zero, and the magnetic pole end faces of the alternating hybrid excitation assembly 1 and the alternating hybrid excitation assembly 4 have no magnetic polarity; however, at the moment, excitation currents in different directions are input to the excitation coils of other alternating hybrid excitation assemblies, namely the alternating hybrid excitation assembly 2, the alternating hybrid excitation assembly 3, the alternating hybrid excitation assembly 5 and the alternating hybrid excitation assembly 6, and the excitation currents input to the alternating hybrid excitation assemblies are in the direction making the magnetic polarity of the magnetic pole end faces of each alternating hybrid excitation assembly identical with that of the permanent magnet in front in the moving direction of the movable component and opposite to that of the permanent magnet behind in the moving direction of the movable component. At the moment, the alternating hybrid excitation assembly 2 repulses the permanent magnet 3 and attracts the permanent magnet 2, the alternating hybrid excitation assembly 3 repulses the permanent magnet 4 and attracts the permanent magnet 3, the alternating hybrid excitation assembly 5 repulses the permanent magnet 7 and attracts the permanent magnet 6, and the alternating hybrid excitation assembly 6 repulses the permanent magnet 8 and attracts the permanent magnet 7. In an extremely short time interval after the moment, excitation currents are input to the excitation coils of the alternating hybrid excitation assembly 1 and the alternating hybrid excitation assembly 4 again, the excitation current input to the alternating hybrid excitation assembly 1 is in the direction making the magnetic polarity of the magnetic pole end faces of the alternating hybrid excitation assembly 1 identical with that of the permanent magnet 1, so that the alternating hybrid excitation assembly 1 repulses the permanent magnet 1, and the movable component is then pushed to move rightwards; and the excitation current input to the alternating hybrid excitation assembly 4 is in the direction making the magnetic polarity of the magnetic pole end faces of the alternating hybrid excitation assembly 4 identical with that of the permanent magnet 5 and opposite to that of the permanent magnet 4, and thus the alternating hybrid excitation assembly 4 repulses the permanent magnet 5 and attracts the permanent magnet 4.

As is shown in FIG. 12, at the second position, the vertical center lines of the permanent magnet 2 and the permanent magnet 6 of the movable component separately coincide with vertical center lines of the alternating hybrid excitation assembly 2 and the alternating hybrid excitation assembly 5 of the fixed component, and at the moment, the excitation current in the excitation coils of the alternating hybrid excitation assembly 2 and the alternating hybrid excitation assembly 5 is zero, and the alternating hybrid excitation assembly 2 and the alternating hybrid excitation assembly 5 have no magnetic polarity; however, at the moment, excitation currents in different directions are input to the excitation coils of other alternating hybrid excitation assemblies, namely the alternating hybrid excitation assembly 1, the alternating hybrid excitation assembly 3, the alternating hybrid excitation assembly 4 and the alternating hybrid excitation assembly 6, and the excitation currents input to the alternating hybrid excitation assemblies are in the direction making the magnetic polarity of the magnetic pole end faces of each alternating hybrid excitation assembly identical with that of the permanent magnet in front in the moving direction of the movable component and opposite to that of the permanent magnet behind in the moving direction of the movable component. The alternating hybrid excitation assembly 1, the alternating hybrid excitation assembly 3, the alternating hybrid excitation assembly 4 and the alternating hybrid excitation assembly 6 repulse and attract the permanent magnets on the movable component.

As is shown in FIG. 13, at the third position, the vertical center lines of the permanent magnet 3 and the permanent magnet 7 of the movable component separately coincide with the vertical center lines of the alternating hybrid excitation assembly 3 and the alternating hybrid excitation assembly 6 of the fixed component, at the moment, the excitation current in the excitation coils of the alternating hybrid excitation assembly 3 and the alternating hybrid excitation assembly 6 is zero, and the magnetic pole end faces of the alternating hybrid excitation assembly 3 and the alternating hybrid excitation assembly 6 have no magnetic polarity; however, at the moment, excitation currents in different directions are input to the excitation coils of other alternating hybrid excitation assemblies, namely the alternating hybrid excitation assembly 2, the alternating hybrid excitation assembly 4, the alternating hybrid excitation assembly 5 and the alternating hybrid excitation assembly 7, and the excitation currents input to the alternating hybrid excitation assemblies are in the direction making the magnetic polarity of the magnetic pole end faces of each alternating hybrid excitation assembly identical with that of the permanent magnet in front in the moving direction of the movable component and opposite to that of the permanent magnet behind in the moving direction of the movable component. The alternating hybrid excitation assembly 2, the alternating hybrid excitation assembly 4, the alternating hybrid excitation assembly 5 and the alternating hybrid excitation assembly 7 repulse and attract the permanent magnets on the movable component. At the moment, as the permanent magnet on the alternating hybrid excitation assembly 1 leaves away, the excitation current in the excitation coil of the alternating hybrid excitation assembly 1 becomes zero.

From the first position to the third position, a complete drive cycle of the linear motor in the embodiment is formed. It can thus be seen that the movable component can be made to move linearly along the longitudinal axis of the fixed component as long as excitation control currents in determined directions are duly input to the alternating hybrid excitation assemblies on the fixed component base.

In the embodiment, as the alternating hybrid excitation assemblies are adopted, the magnetic potential of the permanent magnets inlaid in the two iron cores of each alternating hybrid excitation assembly are also effectively used, and thus the energy efficiency and acceleration performance of the linear motor in the embodiment are improved.

The fifth embodiment of the invention provides the application of the double-layer alternating hybrid excitation assembly capable of generating an alternating resultant magnetic field to another linear motor.

Figure 14:
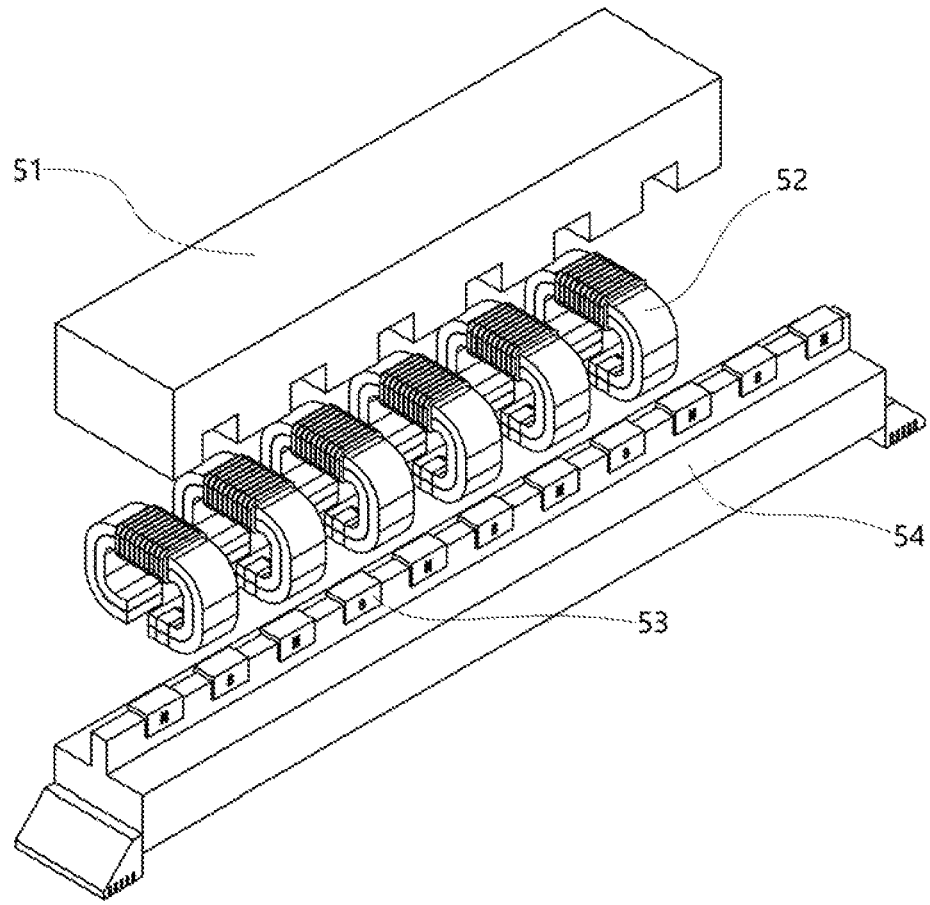
FIG. 14 is a structural assembly diagram of an alternating hybrid excitation linear motor in the fifth embodiment of the invention.

The structure of the linear motor in the embodiment is shown in FIG. 14.

In the embodiment, a fixed component is composed of a fixed component base 54 and a plurality of permanent magnets 53, and the multiple permanent magnets 53 are inlaid in slots of the fixed component base 54 at set equal intervals. The two permanent magnetic pole end faces of each permanent magnet 53 are perpendicular to the longitudinal axis of the fixed component base 53, namely the two permanent magnetic pole end faces of each permanent magnet 53 are in the direction perpendicular to the longitudinal axis of the fixed component base, and every two adjacent permanent magnets 53 have different magnetic polarities. In the embodiment, a movable component is composed of a movable component base 51 and a plurality of alternating hybrid excitation assemblies 52, and the multiple alternating hybrid excitation assemblies 52 are fixed into slots of the movable component base 51 at set equal intervals. Each alternating hybrid excitation assembly 52 is provided with two C-shaped iron cores, wherein a C-shaped magnetic isolation layer is arranged between the two C-shaped iron cores, each C-shaped iron core is provided with two rectangular notches close to the open-loop position, and two permanent magnets are inlaid in the two rectangular notches of each iron core separately; and the two permanent magnets inlaid in the two rectangular notches of each C-shaped iron core have the same magnetic polarity, and the magnetic polarity of the two permanent magnets inlaid in the two rectangular notches of one C-shaped iron core is opposite to that of the two permanent magnets inlaid in the two rectangular notches of the other C-shaped iron core (as is shown in FIG. 1). The movable component moves linearly along the longitudinal axis of the fixed component. The magnetic pole end faces of each C-shaped alternating hybrid excitation assembly are opposite to the permanent magnetic pole end faces of each permanent magnet on the fixed component base, and air gaps are reserved between the magnetic pole end faces of the alternating hybrid excitation assemblies and the permanent magnetic pole end faces.

Figure 15:
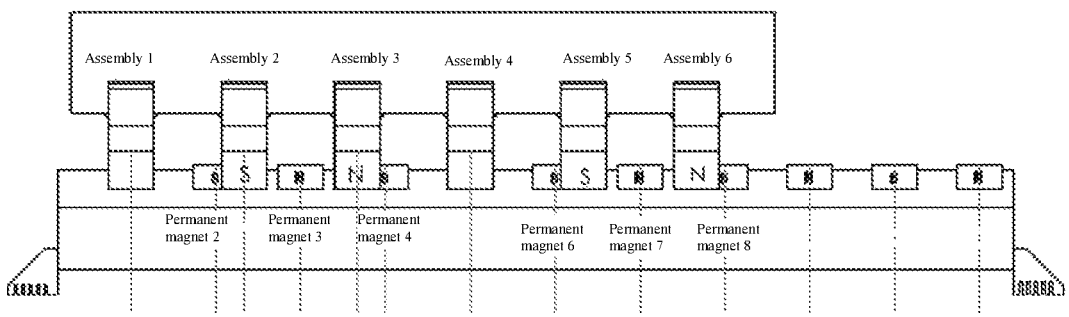
FIG. 15 is a diagram of a first characteristic position of the alternating hybrid excitation linear motor in the fifth embodiment of the invention.
Figure 16:
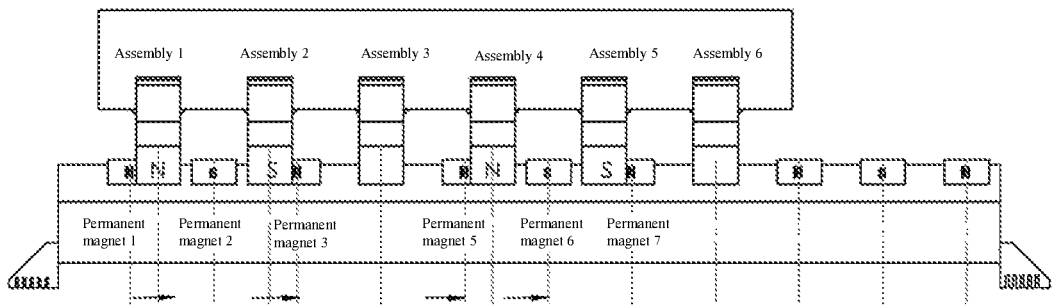
FIG. 16 is a diagram of a second characteristic position of the alternating hybrid excitation linear motor in the fifth embodiment of the invention.
Figure 17:
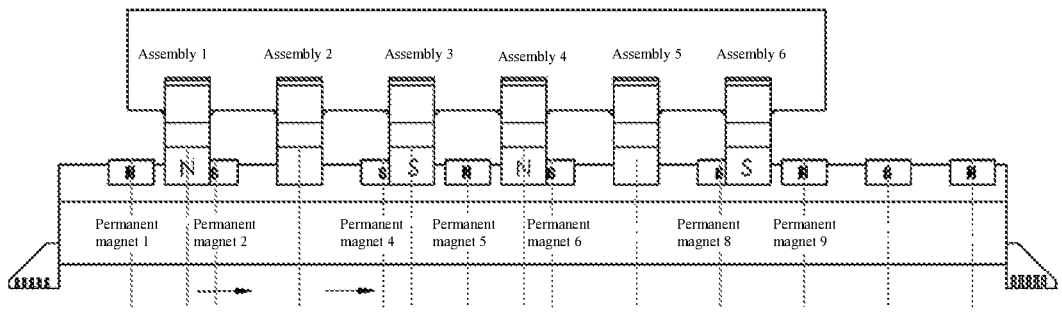
FIG. 17 is a diagram of a third characteristic position of the alternating hybrid excitation linear motor in the fifth embodiment of the invention.

In the embodiment, when the movable component moves linearly along the longitudinal axis of the fixed component, the characteristics of three characteristic positions of the movable component relative to the fixed component are shown in FIGS. 15-17.

As is shown in FIG. 15, at the first position, the vertical center lines of the alternating hybrid excitation assembly 1 and the alternating hybrid excitation assembly 4 on the movable component separately coincide with the permanent magnet 1 and the permanent magnet 5 on the fixed component, at the moment, the excitation current in the excitation coils of the alternating hybrid excitation assembly 1 and the alternating hybrid excitation assembly 4 is zero, and the magnetic pole end faces of the alternating hybrid excitation assembly 1 and the alternating hybrid excitation assembly 4 have no magnetic polarity; however, at the moment, excitation currents in different directions are input to the excitation coils of the alternating hybrid excitation assembly 2, the alternating hybrid excitation assembly 3, the alternating hybrid excitation assembly 5 and the alternating hybrid excitation assembly 6, and the excitation currents input to the alternating hybrid excitation assemblies are in the directions making the magnetic polarity of the magnetic pole end faces of each alternating hybrid excitation assembly opposite to that of the permanent magnet in front in the moving direction of the movable component and identical with that of the permanent magnet behind in the moving direction of the movable component. The alternating hybrid excitation assembly 2, the alternating hybrid excitation assembly 3, the alternating hybrid excitation assembly 5 and the alternating hybrid excitation assembly 6 separately repulse and attract the permanent magnets around the alternating hybrid excitation assemblies, so that reactive force is obtained, and accordingly, the movable component is made to move along the longitudinal axis of the fixed component.

As is shown in FIG. 16, at the second position, the vertical center lines of the alternating hybrid excitation assembly 3 and the alternating hybrid excitation assembly 6 on the movable component separately coincide with the vertical center lines of the permanent magnets 4 and the permanent magnets 8 on the fixed component, at the moment, the excitation current in the excitation coils of the alternating hybrid excitation assembly 3 and the alternating hybrid excitation assembly 6 is zero, and the magnetic pole end faces of the alternating hybrid excitation assembly 3 and the alternating hybrid excitation assembly 6 have no magnetic polarity; however, at the moment, excitation currents in different directions are input to the excitation coils of the alternating hybrid excitation assembly 1, the alternating hybrid excitation assembly 2, the alternating hybrid excitation assembly 4 and the alternating hybrid excitation assembly 5, and the excitation currents input to the alternating hybrid excitation assemblies are in the directions making the magnetic polarity of the magnetic pole end faces of each alternating hybrid excitation assembly opposite to that of the permanent magnet in front in the moving direction of the movable component and identical with that of the permanent magnet behind in the moving direction of the movable component. The alternating hybrid excitation assembly 1, the alternating hybrid excitation assembly 2, the alternating hybrid excitation assembly 4 and the alternating hybrid excitation assembly 5 separately repulse and attract the permanent magnets around the alternating hybrid excitation assemblies, so that reactive force is obtained, and accordingly, the movable component is made to move along the longitudinal axis of the fixed component.

As is shown in FIG. 17, at the third position, the vertical center lines of the alternating hybrid excitation assembly 2 and the alternating hybrid excitation assembly 5 separately coincide with the vertical center lines of the permanent magnet 3 and the permanent magnet 7 of the fixed component, at the moment, the excitation current in the excitation coils of the alternating hybrid excitation assembly 2 and the alternating hybrid excitation assembly 5 is zero, and the magnetic pole end faces of the alternating hybrid excitation assembly 2 and the alternating hybrid excitation assembly 5 have no magnetic polarity; however, at the moment, excitation currents in different directions are input to the excitation coils of the alternating hybrid excitation assembly 1, the alternating hybrid excitation assembly 3, the alternating hybrid excitation assembly 4 and the alternating hybrid excitation assembly 6, and the excitation currents input to the alternating hybrid excitation assemblies are in the directions making the magnetic polarity of the magnetic pole end faces of each alternating hybrid excitation assembly opposite to that of the permanent magnet in front in the moving direction of the movable component and identical with that of the permanent magnet behind in the moving direction of the movable component. The alternating hybrid excitation assembly 1, the alternating hybrid excitation assembly 3, the alternating hybrid excitation assembly 4 and the alternating hybrid excitation assembly 6 separately repulse and attract the permanent magnets around the alternating hybrid excitation assemblies, so that reactive force is obtained, and the movable component is made to move along the longitudinal axis of the fixed component.

The three movement characteristic positions of the linear motor in the embodiment are shown in FIGS. 15-17. It can thus be seen that the movable component can be made to move linearly along the longitudinal axis of the fixed component as long as excitation control currents in determined directions are duly input to the alternating hybrid excitation assemblies on the movable component.

Sixth Embodiment

Figure 18:
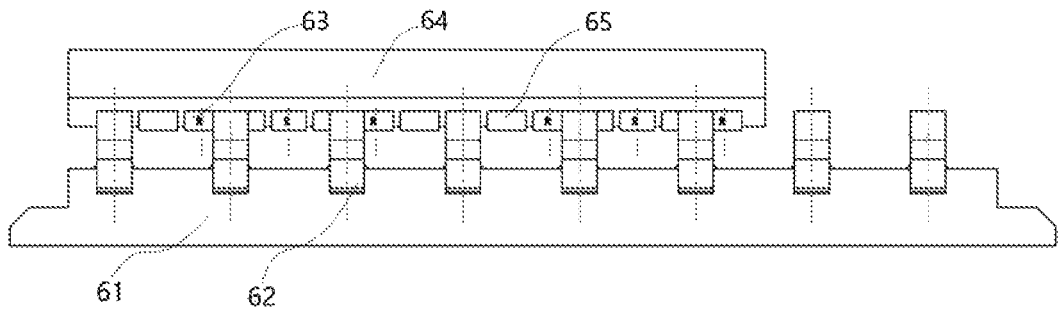
FIG. 18 is a structural diagram of a hybrid excitation linear motor with permanent magnets and magnetizers inlaid in a movable component in the sixth embodiment of the invention.

The sixth embodiment is the improvement of the fourth embodiment. As is shown in FIG. 18, magnetizers 65 are additionally arranged between the permanent magnets 63 on the movable component base 64 in the embodiment.

The driving principle and mechanism of the sixth embodiment are the same as those of the fourth embodiment and thus are not illustrated anymore.

In the embodiment, when the linear motor moves, the magnetizers 65 on the movable component base 64 can interact with the alternating hybrid excitation assemblies 62, so that on the one hand, negative influences of a reverse magnetic field formed by current reversing of the excitation coils of the alternating hybrid excitation assemblies on the fixed component base 61 on the magnetic performance of the permanent magnet materials are reduced, and on the other hand, the magnetizers provide a magnetic loop for the alternating hybrid excitation assemblies on the fixed component and thus also participate in the moment work of the motor, thereby further improving the torque of the whole motor, or reducing the number of required permanent magnets under the same torque output condition, and also reducing cost and the reversing frequency of an excitation power supply.

Seventh Embodiment

Figure 19:
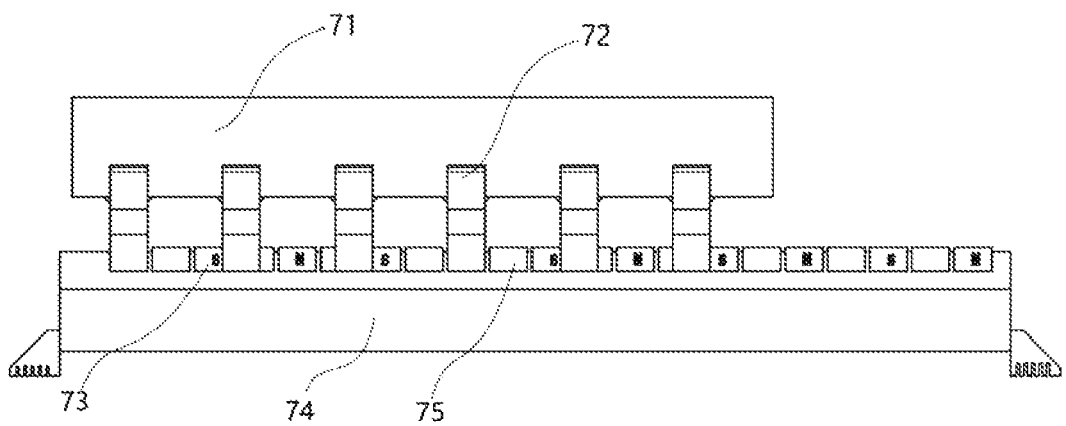
FIG. 19 is a structural diagram of a hybrid excitation linear motor with permanent magnets and magnetizers inlaid in a fixed component in the seventh embodiment of the invention.

The seventh embodiment is the improvement of the fifth embodiment, and as is shown in FIG. 19, magnetizers are additionally arranged between the permanent magnets of the fixed component in the embodiment.

In the embodiment, when the linear motor moves, the magnetizers 75 on the fixed component base 74 can interact with the alternating hybrid excitation assemblies 72 on the movable component base 71, so that on the one hand, negative influences of a reverse magnetic field formed by current reversing of the excitation coils of the alternating hybrid excitation assemblies on the movable component on the magnetic performance of the permanent magnet 73 materials on the movable component are reduced, and on the other hand, the magnetizers provide a magnetic loop for the alternating hybrid excitation assemblies on the movable component and thus also participate in the moment work of the motor, thereby further improving the torque of the whole motor, or reducing the number of required permanent magnets under the same torque output condition, and also reducing cost and the reversing frequency of an excitation power supply.

Eighth Embodiment

The eighth embodiment of the invention provides the application of the alternating hybrid excitation assembly to a transformer.

Figure 20:
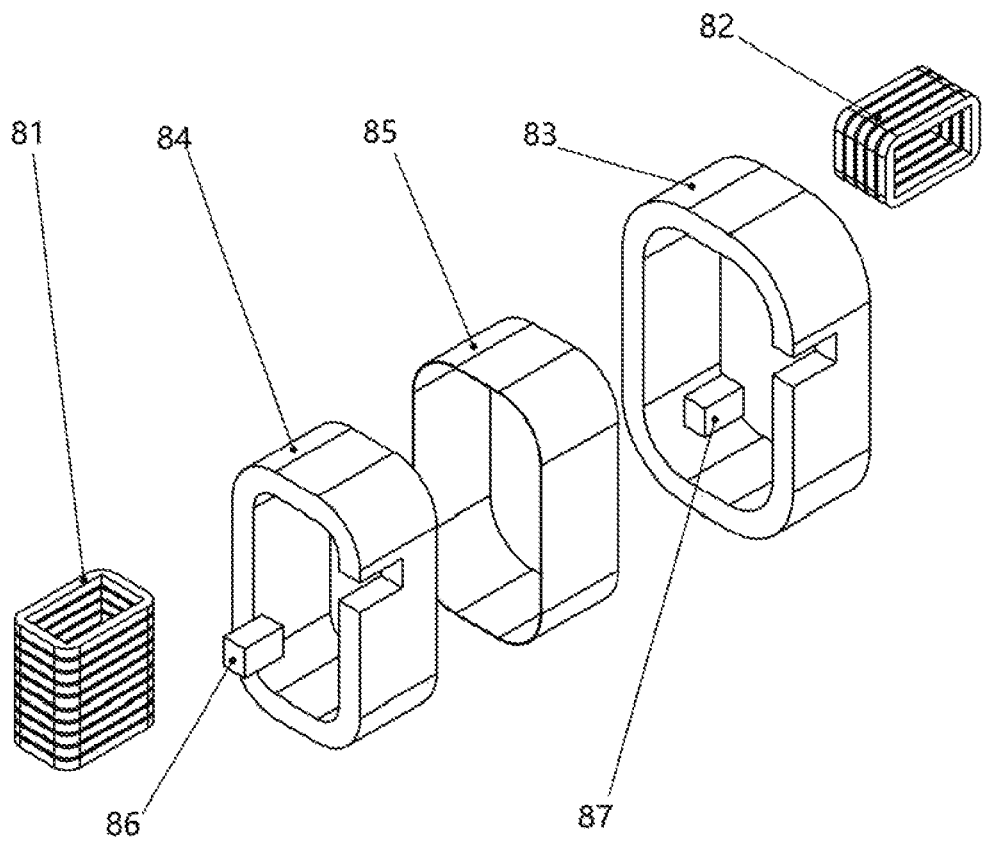
FIG. 20 is a structural exploded diagram of an alternating hybrid excitation assembly capable of generating an alternating magnetic field in the eighth embodiment of the invention, wherein two iron cores are each in a closed-loop rectangle shape.
Figure 21:
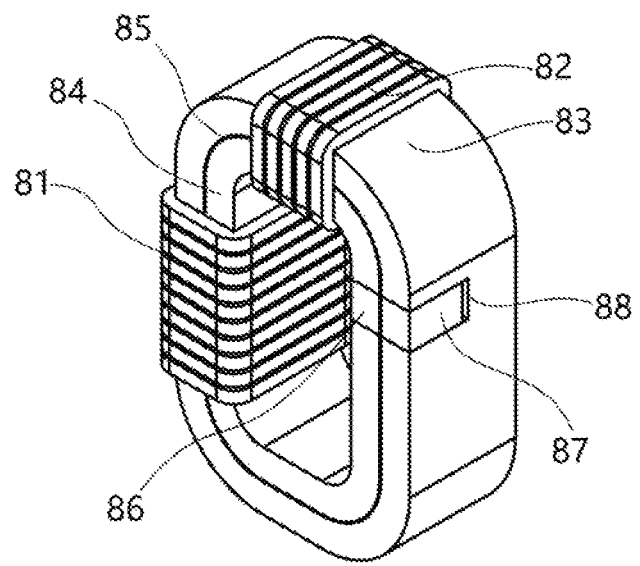
FIG. 21 is a structural outline drawing of the alternating hybrid excitation assembly capable of generating an alternating magnetic field in the eighth embodiment of the invention, wherein the two iron cores are each in a closed-loop rectangle shape.

The structure of the embodiment is shown in FIG. 20 and FIG. 21.

In the embodiment, the alternating hybrid excitation assembly is provided with two closed-loop rectangular iron cores, and a closed-loop rectangular magnetic isolation layer 85 is arranged between the outer iron core 83 and the inner iron core 84. Each iron core is provided with two rectangular notches. Rectangular permanent magnets 87 are inlaid in the rectangular notches of the outer iron core 83. Rectangular permanent magnets 86 are also inlaid in the rectangular notches of the inner iron core 84. The N magnetic pole faces of the rectangular permanent magnets 87 are closely attached to the upper edges of the rectangular notches of the outer iron core 83, the S magnetic pole faces of the rectangular permanent magnets 87 are closely attached to the lower edges of the rectangular notches of the outer iron core 83, and gaps are reserved between one side faces of the rectangular permanent magnets 87 and the side edges of the rectangular notches of the outer iron core. Similarly, the N magnetic pole faces of the rectangular permanent magnets 86 are closely attached to the lower edges of the rectangular notches of the inner iron core 84, the S magnetic pole faces of the rectangular permanent magnets 86 are closely attached to the upper edges of the rectangular notches of the inner iron core 84. An input coil 81 and an output coil 82 surround the closed-loop iron cores of the alternating hybrid excitation assembly.

FIGS. 22-30 show the conditions where currents in different directions are input to a primary coil of the transformer or no current is input to the primary coil of the transformer.

Figure 22:
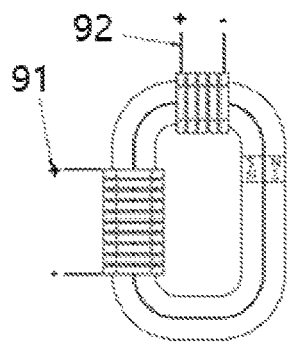
FIG. 22 is a sectional view of a closed-loop double-layer iron core assembly in the state where a forward current is input to a primary coil in the eighth embodiment of the invention.
Figure 23:
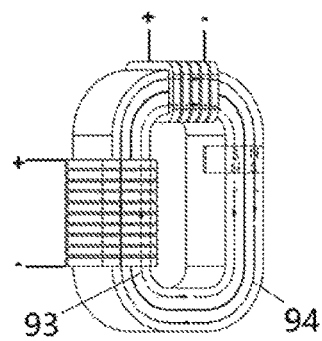
FIG. 23 is a structural outline drawing of the closed-loop double-layer iron core assembly in the state where a forward current is input to the primary coil in the eighth embodiment of the invention.
Figure 24:
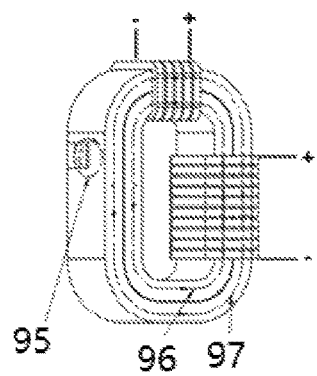
FIG. 24 is a structural outline drawing of the closed-loop double-layer iron core assembly from another perspective in the state where a forward current is input to the primary coil in the eighth embodiment of the invention.

FIG. 22 shows the condition where a forward current is input to the primary coil 91. FIG. 23 shows that a hybrid excitation magnetic force line 93 is formed in the inner iron core, and only an excitation magnetic force line 94 is formed in the outer iron core. FIG. 24 shows that a magnetic force line 95 generated by the permanent magnets in the outer iron core is not superimposed with an excitation magnetic force line 97 of the outer iron core, and the magnetic force line 96 of the inner iron core is a hybrid excitation magnetic force line and is the combination of the permanent magnetic force line generated by the permanent magnets inlaid in the inner iron core and the excitation magnetic force line formed in the inner iron core under the current excitation of the primary coil.

Figure 25:
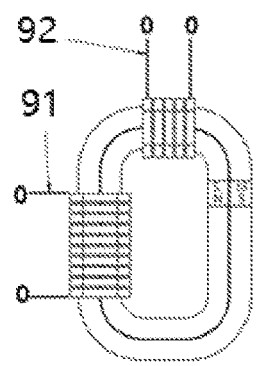
FIG. 25 is a sectional view of the closed-loop double-layer iron core assembly in the state where no current is input to the primary coil in the eighth embodiment of the invention.
Figure 26:
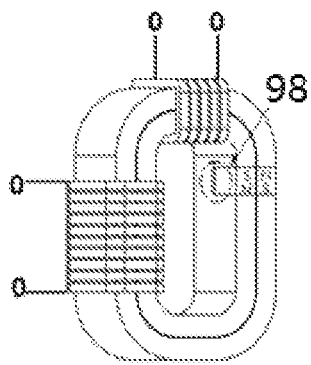
FIG. 26 is a structural outline drawing of the closed-loop double-layer iron core assembly in the state where no current is input to the primary coil in the eighth embodiment of the invention.
Figure 27:
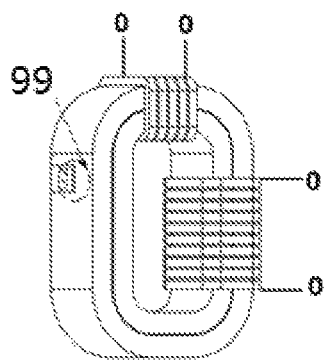
FIG. 27 is a structural outline drawing of the closed-loop double-layer iron core assembly from another perspective in the state where no current is input to the primary coil in the eighth embodiment of the invention.

FIG. 25 shows that no current is input to the primary coil 91 and the secondary coil 92. FIG. 26 shows that no excitation magnetic force line is formed in the inner iron core and only a closed-loop permanent magnetic force line 98 is formed in the inner iron core. FIG. 27 shows that no excitation magnetic force line is formed in the outer iron core and only a closed-loop permanent magnetic force line 99 is formed in the outer iron core.

Figure 28:
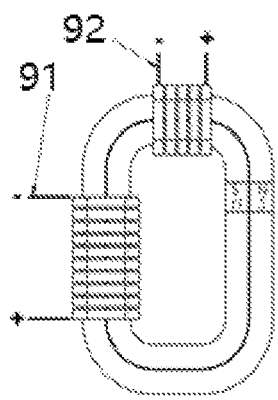
FIG. 28 is a sectional view of the closed-loop double-layer iron core assembly in the state where a reverse current is input to the primary coil in the eighth embodiment of the invention.
Figure 29:
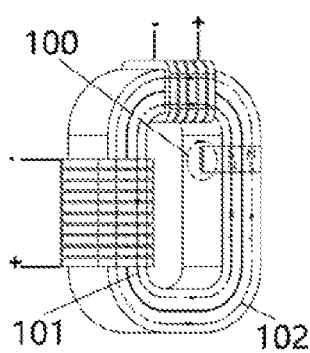
FIG. 29 is a structural outline drawing of the closed-loop double-layer iron core assembly in the state where a reverse current is input to the primary coil in the eighth embodiment of the invention.
Figure 30:
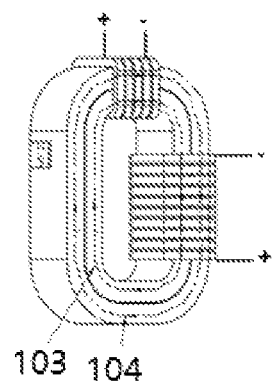
FIG. 30 is a structural outline drawing of the closed-loop double-layer iron core assembly from another perspective in the state where a reverse current is input to the primary coil in the eighth embodiment of the invention.

FIG. 28 shows that a reverse current is input to the primary coil 91. FIG. 29 shows a permanent magnetic force line 100 of the inner iron core, an excitation magnetic force line 101 in the inner iron core, and a hybrid excitation magnetic force line 102 in the outer iron core. FIG. 30 shows an excitation magnetic force line 103 in the inner iron core and a hybrid excitation magnetic force line 104 in the outer iron core.

In the embodiment, if an alternating current is input to the primary coils 91, alternating currents with different voltages and identical frequency changes can be instantly generated in the secondary coil 92. As the magnetic polarity direction of the permanent magnets in one closed-loop iron core is different from that of the permanent magnets in the other closed-loop iron core, no matter in which direction the alternating current is input to the primary coil 91, a permanent magnet flux and an excitation flux are always superimposed and combined to cut the secondary winding 92, then an electrodynamic potential formed by the hybrid flux can be generated on the secondary coil 92, and thus the transformer with a gain function is formed. In this way, the inevitable self loss of the transformer can be compensated, and the energy efficiency of the transformer is improved.

What is claimed is:

1. An alternating hybrid excitation assembly comprising: an even number of iron cores and at least one magnetic isolation layer, wherein:
   two adjacent iron cores are arranged with one iron core inside the other iron core with a respective magnetic isolation layer arranged between the two adjacent iron cores, and the iron cores and the magnetic isolation layer form a closed loop or an open loop, with the proviso that:
   when the iron cores and the magnetic isolation layer form an open loop, each iron core is provided with two notches and an excitation coil surrounds the iron cores, and
   when the iron cores and the magnetic isolation layer form a closed loop, each iron core is provided with one notch and two excitation coils surround the iron cores;
   permanent magnets are inlaid in the notches of the iron cores, two magnetic pole faces of each permanent magnet are closely attached to two opposite sides of the notch of the corresponding iron core, and a gap is reserved between one side face of each permanent magnet and a side edge of the notch of the corresponding iron core; and
   the permanent magnets inlaid in the notches of every two adjacent iron cores have opposite magnetic polarity directions.

2. The alternating hybrid excitation assembly according to claim 1, wherein the iron cores are open-loop C-shaped, U-shaped or V-shaped cores.

3. The alternating hybrid excitation assembly according to claim 1, wherein the iron cores are closed-loop iron cores, and the magnetic isolation layer is closed-loop magnetic isolation layer.

4. An alternating hybrid excitation rotary motor, comprising a rotor and a stator, wherein:
   the stator is composed of a stator base and a plurality of alternating hybrid excitation assemblies, and the plurality of alternating hybrid excitation assemblies are circularly, evenly and symmetrically arranged on the stator base and are magnetically isolated mutually;

each alternating hybrid excitation assembly is provided with two C-shaped iron cores, wherein a C-shaped magnetic isolation layer is arranged between the two C-shaped iron cores, each C-shaped iron core is provided with two notches close to two magnetic pole end faces of the C-shaped iron core, two permanent magnets are separately inlaid in the two notches of each C-shaped iron core, a gap is reserved between one side face of each permanent magnet and a side edge of the notch of the corresponding iron core, the two permanent magnets inlaid in the two notches of each C-shaped iron core have the same magnetic polarity direction, and the magnetic polarity direction of the permanent magnets inlaid in the notches of one C-shaped iron core is opposite to that of the permanent magnets inlaid in the notches of the other C-shaped iron core;

the rotor is composed of a rotary shaft, a circular support and a plurality of permanent magnet units, the rotary shaft is fixed to the circular support, the plurality of permanent magnet units are arranged on the circular support, a gap is reserved between every two adjacent permanent magnet units, and every two adjacent permanent magnet units have different magnetic polarities; and when the rotor rotates, the two permanent magnetic pole faces of each permanent magnet unit on the circular support can coincide with and then pass through the two magnetic pole end faces of the C-shaped iron cores of each alternating hybrid excitation assembly on the stator base, and air gaps are reserved between permanent magnetic pole end faces of the permanent magnet units and the magnetic pole end faces of the C-shaped iron cores.

5. The alternating hybrid excitation rotary motor according to claim 4, wherein the rotor is further composed of magnetizer units, the rotary shaft is fixed to the circular support, the permanent magnet units and the magnetizer units are alternately and evenly arranged on the circular support, a gap is reserved between each magnetizer unit and the adjacent permanent magnet unit, and every two adjacent permanent magnet units have different polarity directions.

6. An alternating hybrid excitation linear motor, comprising a movable component and a fixed component wherein:

the fixed component is composed of a fixed component base and a plurality of alternating hybrid excitation assemblies, and the plurality of alternating hybrid excitation assemblies are fixed into slots of the fixed component base at set equal intervals;

each alternating hybrid excitation assembly is provided with two C-shaped iron cores, wherein a C-shaped magnetic isolation layer is arranged between the two C-shaped iron cores, each C-shaped iron core is provided with two rectangular notches close to two magnetic pole end faces of the C-shaped iron core, two permanent magnets are separately inlaid in the two notches of each C-shaped iron core, a gap is reserved between one side face of each permanent magnet and a side edge of the notch of the corresponding iron core, the permanent magnets inlaid in the two notches of each C-shaped iron core have the same magnetic polarity direction, and the magnetic polarity direction of the permanent magnets inlaid in the notches of one C-shaped iron core is opposite to that of the permanent magnets inlaid in the notches of the other C-shaped iron core;

the movable component is composed of a movable component base and a plurality of permanent magnets, the plurality of permanent magnets are inlaid in slots of the movable component base at set equal intervals, every two adjacent permanent magnets have different magnetic polarities, and two permanent magnetic pole end faces of each permanent magnet are perpendicular to a longitudinal axis, along which the movable component moves, of the fixed component base, with the proviso that the two polar end faces of each permanent magnet are parallel and opposite to the two magnetic pole end faces of each of the C-shaped iron cores of the alternating hybrid excitation assemblies; and when the movable component moves linearly along the longitudinal axis of the fixed component, the vertical center line of the magnetic pole end faces of each of the C-shaped iron cores of the alternating hybrid excitation assemblies on the fixed component base sequentially coincides with the vertical center lines of the permanent magnetic pole end faces of the permanent magnets on the movable component base one by one, and air gaps are reserved between the magnetic pole end faces of the C-shaped iron cores of the alternating hybrid excitation assemblies and the permanent magnetic pole end faces.

7. The alternating hybrid excitation linear motor according to claim 6, wherein the movable component is further composed of a plurality of magnetizers, the permanent magnets and the magnetizers are alternately inlaid in slots of the movable component base, the permanent magnetic pole end faces of the permanent magnets and the magnetic conduction end faces of the magnetizers are perpendicular to the longitudinal axis of the fixed component base, and every two adjacent permanent magnets have different magnetic polarities.

8. An alternating hybrid excitation linear motor, comprising a movable component and a fixed component, wherein:

the fixed component is composed of a fixed component base and a plurality of permanent magnets, the plurality of permanent magnets are inlaid in slots of the fixed component base at set equal intervals, every two adjacent permanent magnets have different magnetic polarity directions, and magnetic pole end faces of the permanent magnets are in a direction perpendicular to a longitudinal axis along which a movable component base moves;

the movable component is composed of the movable component base and a plurality of alternating hybrid excitation assemblies, and the plurality of alternating hybrid excitation assemblies are fixed into slots of the movable component base at set equal intervals;

each alternating hybrid excitation assembly is provided with two C-shaped iron cores, wherein a C-shaped magnetic isolation layer is arranged between the two C-shaped iron cores, each C-shaped iron core is provided with two rectangular notches close to two magnetic pole end faces of the C-shaped iron core, two permanent magnets are separately inlaid in the two rectangular notches of each C-shaped iron core, a gap is reserved between one side face of each permanent magnet and a side edge of the notch of the corresponding C-shaped iron core, the two permanent magnets inlaid in the two rectangular notches of each iron core have the same magnetic polarity direction, and the magnetic polarity direction of the permanent magnets inlaid in the notches of one C-shaped iron core is opposite to that of the permanent magnets inlaid in the notches of the other C-shaped iron core;

the magnetic pole end faces of each permanent magnet on the fixed component base are parallel and opposite to the two magnetic pole end faces of each of the C-shaped iron cores of the alternating hybrid excitation assemblies on the movable component base, and air gaps are reserved between the magnetic pole end faces of the C-shaped iron cores of the alternating hybrid excitation assemblies and the magnetic pole end faces of the permanent magnets; and when the movable component moves linearly along the longitudinal axis of the fixed component, the vertical center line of the magnetic pole end faces of each C-shaped iron core of the alternating hybrid excitation assemblies on the movable component sequentially coincides with the vertical center line of the permanent magnetic pole end faces of each permanent magnet on the fixed component base one by one.

9. The alternating hybrid excitation linear motor according to claim 8, wherein the fixed component is further composed of a plurality of magnetizers, the permanent magnets and the magnetizers are alternately inlaid in slots of the fixed component base, the magnetic pole end faces of the permanent magnets and the magnetic conduction end faces of the magnetizers are perpendicular to the longitudinal axis of the fixed component base, and every two adjacent permanent magnets have different magnetic polarities.

10. An alternating hybrid excitation transformer comprising:

an alternating hybrid excitation assembly comprising:

an input coil; and an output coil, wherein:

the alternating hybrid excitation assembly is composed of an even number of closed-loop iron cores and at least one closed-loop magnetic isolation layer, with the proviso that a respective closed-loop magnetic isolation layer is arranged between two adjacent closed-loop iron cores;

each iron core is provided with a notch, a permanent magnet is inlaid in the notch of the corresponding iron core, two magnetic pole faces of each permanent magnet are closely attached to two opposite sides of the notch of the corresponding iron core, and a gap is reserved between one side face of each permanent magnet and a side edge of the notch of the corresponding iron core; and the permanent magnets inlaid in the notches of the two adjacent iron cores have opposite magnetic polarity directions, and the input coil and the output coil surround the closed-loop iron cores of the alternating hybrid excitation assembly.

\* \* \* \* \*